United States Patent [19]
Rothstein

[11] Patent Number: 5,415,013
[45] Date of Patent: May 16, 1995

[54] MODULAR CONSTRUCTED AIR TREATMENT PLANT FOR FOODSTUFF

[75] Inventor: Sven-Olle Rothstein, Angelholm, Sweden

[73] Assignee: Frigoscandia Food Process Systems AB, Helsingborg, Sweden

[21] Appl. No.: 211,405

[22] PCT Filed: Oct. 2, 1992

[86] PCT No.: PCT/SE92/00689
  § 371 Date: Apr. 1, 1994
  § 102(e) Date: Apr. 1, 1994

[87] PCT Pub. No.: WO93/07428
  PCT Pub. Date: Apr. 15, 1993

[30] Foreign Application Priority Data
  Oct. 3, 1991 [SE] Sweden .................... 9102861

[51] Int. Cl.[6] ............................ F25D 25/04
[52] U.S. Cl. ...................... 62/380; 312/236; 312/401; 312/406
[58] Field of Search .............. 62/374, 380, 63; 312/401, 406, 236

[56] References Cited

U.S. PATENT DOCUMENTS

| | | | |
|---|---|---|---|
| 2,223,972 | 12/1940 | Sterling . | |
| 2,474,069 | 6/1949 | Silvera . | |
| 2,783,618 | 3/1957 | Mills | 62/380 |
| 3,019,618 | 2/1962 | Meyer | 62/380 |
| 3,024,623 | 3/1962 | Forster et al. | 62/380 |
| 3,115,756 | 12/1963 | Overbye . | |
| 3,287,932 | 11/1966 | Schlemmer, Jr. | 62/374 |
| 3,434,301 | 3/1969 | Hice | 62/374 |
| 3,472,570 | 10/1969 | Moran | 62/374 |
| 3,580,000 | 5/1971 | Wagner | 62/380 |
| 3,818,719 | 6/1974 | Banike | 62/380 |
| 3,841,109 | 10/1974 | Cann | 62/380 |
| 4,532,857 | 8/1985 | Sollich | 62/380 |
| 4,580,413 | 4/1986 | Klee | 62/380 |

FOREIGN PATENT DOCUMENTS
363674  1/1974  Sweden .

Primary Examiner—Ronald C. Caposela
Attorney, Agent, or Firm—Browdy and Neimark

[57] ABSTRACT

An air treatment plant for foodstuffs includes an elongate trough (29) for the foodstuffs, a heat exchanger (35), a fan assembly (39) for circulating air on a path through the heat exchanger, through the trough, and back through the heat exchanger, a housing (1) having a housing bottom (7), and side walls (2, 3) with modular units (11) extending transversely to the trough. Each one of the modular units includes an insulation layer (19), a water-impermeable inner layer (20), and two submodules (12, 13). Each has a respective submodule bottom with a respective bottom panel (15, 16) and a side-wall panel (17, 18) forming part of side walls (2, 3). One or more elongate, separate second bottom panels (14) interconnect the first bottom panels (15, 16) of the two submodules. Upper sides of the bottom panels (15, 16) of the submodules slope downwards toward at least one of the second bottom panels (14). One of the second bottom panels has a second upper side sloping downwards towards a one of two end walls (4, 5) of the housing.

10 Claims, 3 Drawing Sheets

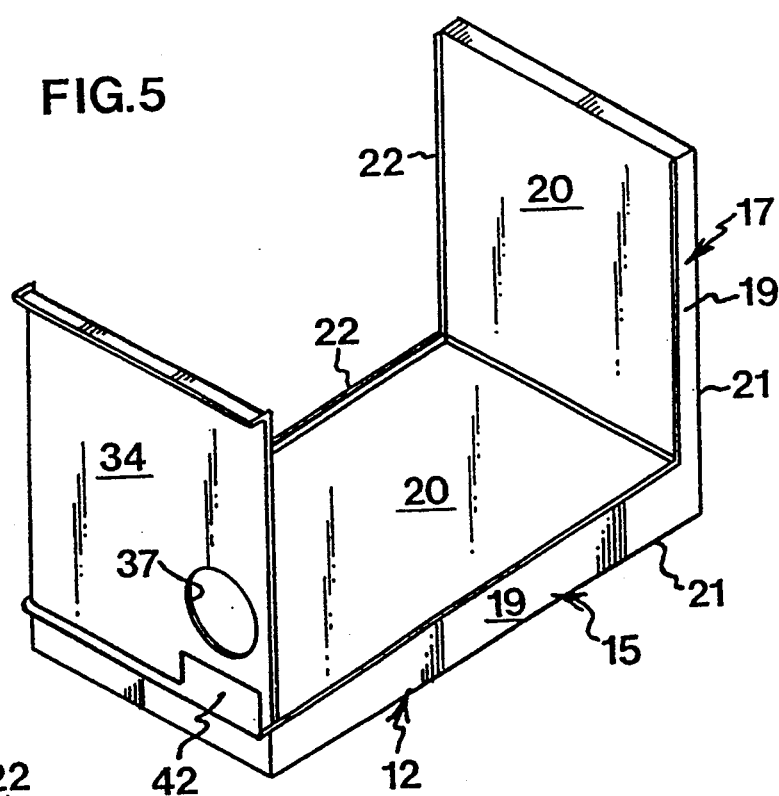
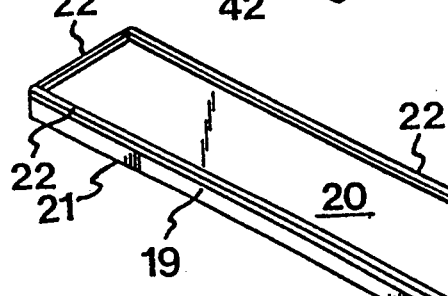
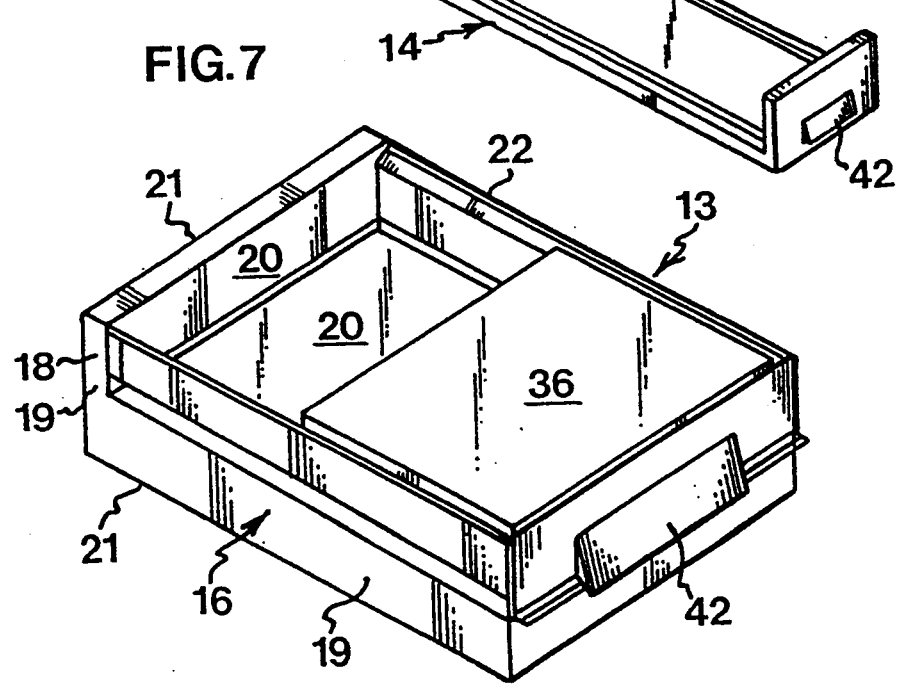

MODULAR CONSTRUCTED AIR TREATMENT PLANT FOR FOODSTUFF

The present invention generally relates to an air treatment plant for foodstuffs, comprising a housing, an elongate trough provided therein for receiving the foodstuff to be treated, a heat exchanger and a fan assembly for producing an air flow circulating through the heat exchanger, up through the trough and back to the heat exchanger.

The invention relates more specifically to a freezing plant, but is also applicable to other air treatment plants, e.g. for cooling, drying or heating. In the freezing plant, the heat exchanger is a cooling-coil battery.

Common to conventional freezing plants of this type is the mechanically complex and bulky design, which of course increases plant costs, complicates their assembly and sometimes—for want of space—also makes it more difficult to run them. Moreover, the complex design makes it difficult to adapt the devices to different product requirements, and also renders maintenance and operation costly and troublesome.

The description above of conventional freezing plants generally applies to previously known air treatment plants of the type stated by way of introduction.

The object of the present invention therefore is to simplify the design and reduce the space requirement of an air treatment plant of the type defined above, whereby also to provide a compact air treatment plant which is comparatively easy to mount, operate, clean and service.

According to the invention, this object is achieved in that the housing is designed with a plurality of substantially identical modular units extending transversely of the longitudinal direction of the trough and comprising self-supporting bottom and side wall panels, each having an insulating layer and, provided on the inside thereof, a layer of stainless steel or similar material, and in that each modular unit is divided into two submodules, each having a bottom panel forming part of the bottom of the housing, and a side wall panel forming part of a respective one of the side walls of the housing.

Thus, air treatment plants of varying size, both longitudinally and laterally, can be easily assembled, and no separate supporting structure for the units included in the air treatment plant is required. By using stainless steel or a material having similar properties on the inside of the bottom and side wall panels, maintenance is facilitated and rigorous hygienic demands can be adequately met.

Suitably, each modular unit is provided with an attachment for a fan included in the fan assembly, and a base for a heat exchanger unit included in the heat exchanger. This provides a practically complete modularisation of the air treatment plant.

By arranging fans and heat exchanger units on the same or substantially the same level, and providing the attachment on one of the submodules and the base on the other, a low overall height is achieved. This also results in a low infeed level and a low outfeed level as compared with conventional air treatment plants, in which the heat exchanger is generally disposed underneath the trough. The low infeed level means that no upward conveyor is required on the infeed side, which yields hygienic advantages. The low outfeed level means that no downward conveyor is required on the outfeed side, whereby delicate products can be treated without any risk of damage.

An especially good compactness can be achieved by letting the side wall panel of one submodule also form a side wall of the trough. Parts included in the air treatment plant for guiding the air flow may consist of partitions, which are also distributed modulewise and one of which can at the same time form the other side wall of the trough.

One or more separate, elongate bottom panels are advantageously used to interconnect the bottom panels of the submodules, the upper sides of the bottom panels of the submodules being given a downward inclination towards one and/or the other end wall of the housing.

A very stable design of the bottom and side wall panels is achieved if these panels are provided with a metal layer also on the outside of the insulating layer. Advantageously, this outer layer consists of stainless steel, but may consist of other materials as well.

To obtain a satisfactory assembly of the modular units, their layers of stainless steel may be provided with flanges directed towards the interior of the housing, at the adjoining edges of the modular units. This makes it possible to easily weld the modular units together by means of weld joints which by their location can easily be checked and which by no means make it more difficult to maintain rigorous hygienic demands. Other methods of assembling the modular units are of course conceivable.

The other side wall parts of the housing, as well as its roof, of course also advantageously consist of modular units comprising self-supporting panels.

The invention, as specifically applied to air treatment plants in the form of freezing plants, will be described in more detail hereinbelow with reference to the accompanying drawings.

FIGS. 5-7 are perspective views of submodules included in the freezing plant of FIGS. 1 and 2.

Figure 1:
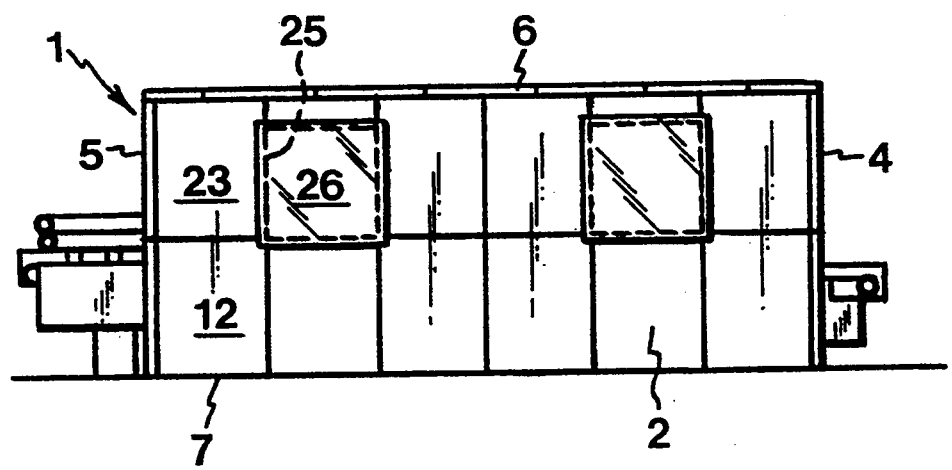
FIGS. 1 and 2 are a side view and a top plan view, respectively, of an embodiment of a freezing plant according to the invention.
Figure 2:
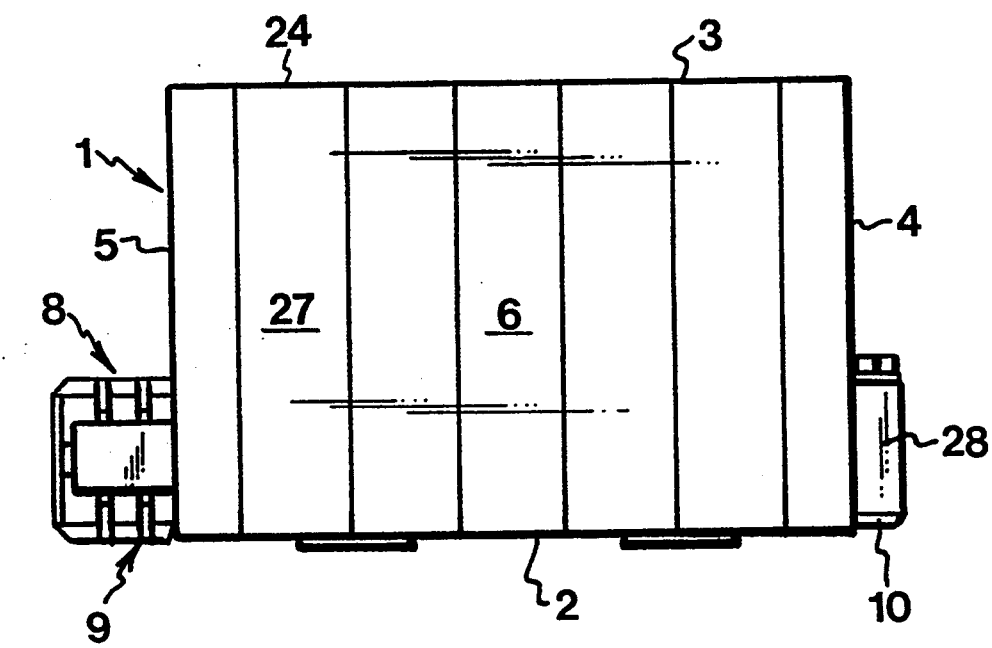

The embodiment of a freezing plant according to the invention illustrated in the drawings has a housing 1 with side walls 2 and 3, end walls 4 and 5, a roof 6 and a bottom 7. The end walls 4 and 5 have openings for a belt conveyor 8 which traverses the housing 1 and may include a single or two or more successive conveyor belts with an infeed station 9 and an outfeed station 10.

The housing 1 is divided into a number of substantially identical modules extending transversely of the longitudinal direction of the belt conveyor 8. More specifically, each module comprises a modular unit 11 consisting of submodules 12 and 13 which together with a bottom panel 14 form the bottom of the housing 1. Thus, the submodules 12 and 13 each have a bottom panel 15 and 16, respectively, as well as side wall panels 17 and 18, respectively, integrated therewith. Both the submodules 12, 13 and the bottom panel 14 consist of a layer 19 of insulating material, which is provided on its upper and inner sides with a layer 20, preferably of stainless steel, e.g. a stainless steel sheet, or similar material, and on its lower and outer sides with a layer 21 which may consist of stainless steel or any other suitable material. The layers 19-21 are joined to each other so as to form a panel-shaped laminate, and constitute a rigid, self-supporting unit.

For linking together adjoining modular units or submodules, the stainless layer 20 has flanges 22 at the adjoining edges of the units or submodules. The flanges 22 are directed towards the interior of the housing 1 in pair-wise parallel relationship. In this manner, the layers 20 can be easily interconnected by means of a weld joint along the free edges of the flanges 22.

The upper sides of the bottom panels 15 and 16 of the submodules 12 and 13 slope downwards towards the bottom panel 14 which interconnect them, and the upper side of the bottom panel 14 slopes downwards towards one of the end walls 4, 5. In long housings 1, two bottom panels 14 can be used, whose upper sides slope downwards, each towards a respective one of the end walls 4, 5.

Each of the submodules 12, 13 supports one side wall panel 23 and 24, respectively. Openings 25 are provided in the side wall 2 and normally covered by optionally transparent doors 26 allowing inspection from outside of the freezing plant which is completely sealed in normal operation. The side wall panels 23, 24 support roof panels 27 which, like the side wall panels 23, 24, are modularised and composed in substantially the same way as the submodules 12, 13 and the bottom panel 14.

The belt conveyor 8 has two conveyor belts 28 which are foraminated, together extend through all the modules of the housing 1 and form the bottom of a trough 29 for receiving the foodstuff to be frozen in the freezing plant. The side wall panels 17 also form a side wall of the trough 29. To make this side wall of the trough completely smooth, the side wall panels 17 may however require a certain lining. The other side wall of the trough 29 consists of a partition 30 also divided into modules and guiding, together with a plurality of other similar partitions 31, 32, 33 and 34, the air flow in the freezing plant.

Figure 3:
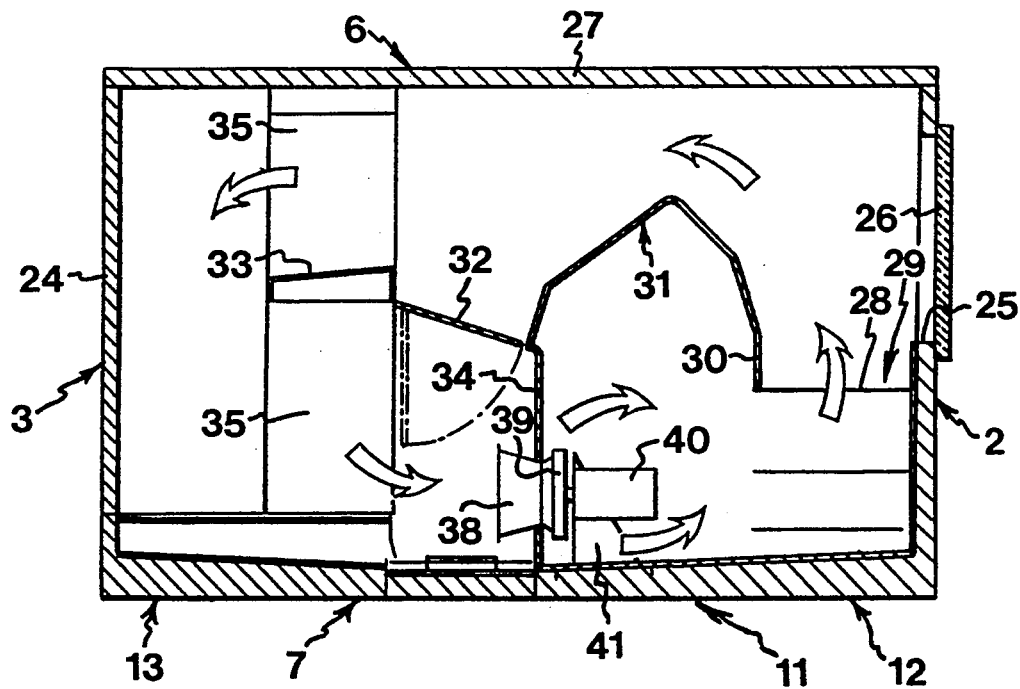
FIG. 3 is a cross-sectional view of the freezing plant in FIGS. 1 and 2.
Figure 4:
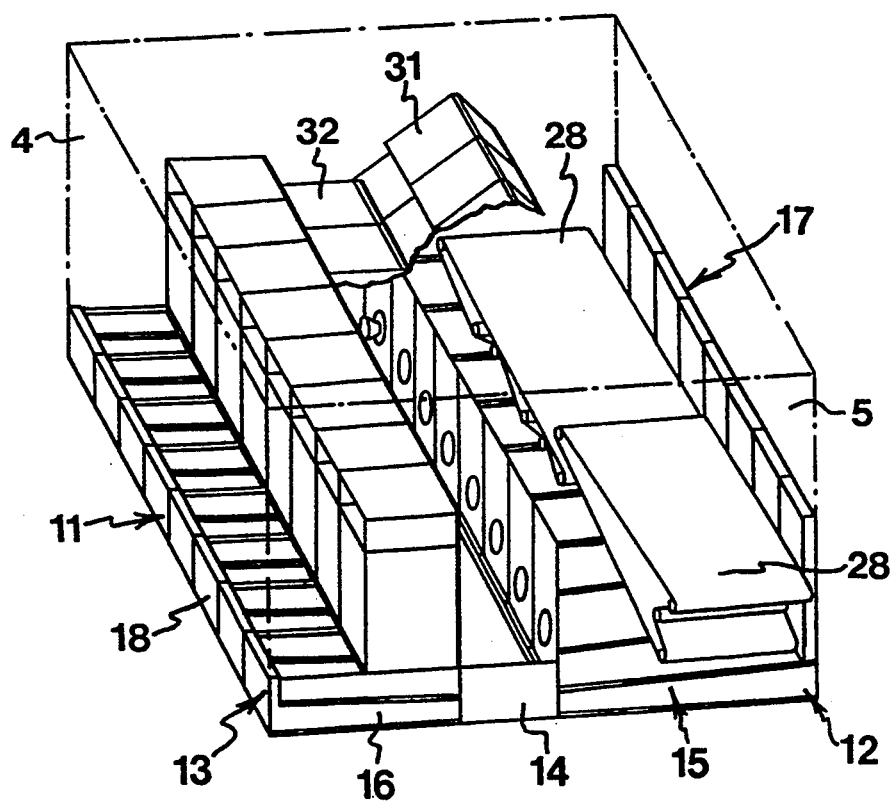
FIG. 4 is a perspective view of the units accommodated in the freezing plant of FIGS. 1 and 2.

As indicated in FIG. 3, the partition 32 can be folded down to facilitate inspection and cleaning of the interior of the freezing plant. The partition 33 is disposed between an upper and a lower part of a cooling-coil battery unit 35 resting on a base 36 provided on the submodule 13. The base 36 consists of a box-shaped sheet-metal structure of stainless steel. The upper part of each cooling-coil battery unit 35 may optionally be excluded, as shown in FIG. 4. The angled partition 31 connects the partitions 30 and 32, and the partition 34, on which the partition 31 rests, extends vertically therefrom to the end of the submodule 12 which is opposite to the side wall panel 17, and has an opening 37 for receiving a suction part 38 of a fan 39 with associated fan motor 40. The fan 39 and the fan motor 40 are mounted on an attachment 41 fixed to the bottom panel 15 of the submodule 12.

The bottom panels 14–16 have at the lowest portion of their upper sides closable drain openings 42 for washing and rinsing liquids used e.g. when cleaning the freezing plant.

In the operation of the freezing plant according to the invention, the module fans 39 which together form the fan assembly of the freezing plant produce an air flow which is illustrated by arrows in FIG. 3 and thus circulates through the cooling-coil battery units 35, together forming the cooling-coil battery of the freezing plant, via the fans 39 up through the trough 29 and back to the cooling-coil battery units 35.

In addition to the advantages described in the introductory part of this specification, the freezing plant according to the invention of course confers other advantages such as simplified stock-keeping and quicker deliveries.

A number of modifications of the preferred embodiment of the present invention as described above are conceivable within the scope of the invention such as it is defined in the accompanying claims. Thus, the invention is applicable to any type of trough which, moreover, need not be provided with a belt conveyor. Further, the bottom panels, side wall panels and roof panels need not necessarily be provided with the outer layer 21. Although the preferred location of the cooling-coil battery and the fan assembly beside each other on substantially the same level is advantageous with regard to the overall height of the freezing plant, this location is not necessary. In addition to the advantages of a low overall height of the housing 1 with low infeed and outfeed levels, this embodiment however also confers the advantage that the submodules 12 can be optionally placed either to the right (as illustrated) or to the left of the submodules 13, as seen in the feeding direction of the belts 28. The freezing plant may of course also be provided with such accessories as built-in washing equipment with suitably positioned spray nozzles, as well as equipment for defrosting the cooling-coil battery during operation.

It should finally be pointed out that the invention is applicable to air treatment plants in general, and is not restricted to freezing plants.

I claim:

1. An air treatment plant for foodstuffs, the plant comprising:
    an elongate trough (29) for receiving the foodstuffs to be treated;
    a heat exchanger (35); fan assembly (39) means for circulating air on a path through the heat exchanger, through the trough, and back through the heat exchanger;
    a housing (1) having a housing bottom (7) and first side walls (2, 3), and further comprising a plurality of substantially identical modular units (11) extending transversely to a longitudinal direction of the trough;
    each one of the modular units including an insulation layer (19), and a water-impermeable inner layer (20);
    each modular unit further comprising two submodules (12, 13) each including a respective submodule bottom further including a respective one of first bottom panels (15, 16) and a side-wall panel (17, 18) forming part of a respective one of the first side walls (2, 3) of the housing;
    wherein one or more elongate, separate second bottom panels (14) interconnect the first bottom panels (15, 16) of the two submodules; and
    wherein first upper sides of the bottom panels (15, 16) of the submodules slope downwards toward at least one of the second bottom panels (14), the one of the second bottom panels having a second upper side sloping downwards towards a one of two end walls (4, 5) of the housing.

2. The air treatment plant as claimed in claim 1, characterised in that it constitutes a freezing plant.

3. The air treatment plant as claimed in claim 1, wherein the side wall panel (17) of one submodule (12) forms one of the side walls.

4. The air treatment plant as claimed in claim 3, characterised in that each modular unit (11) also comprises partitions (30, 34) which form a second side wall of the trough (29) and, together with the side walls (2, 3), the end walls (4, 5) and a roof (6) of the housing (1), form a duct for guiding the air flow.

5. The air treatment plant as claimed in claim 4, characterised in that each modular unit (11) has an attachment (41) for a fan (39) included in the assembly, and a base (36) for a heat exchanger unit (35) included in the heat exchanger.

6. The air treatment plant as claimed in claim 5, characterised in that the attachment (41) is provided on one submodule (12) and the base (36) on the other submodule (13).

7. The air treatment plant as claimed in claim 6, wherein second bottom panels, first bottom panels, and side-wall panel include a metal layer (21) on an outside of the insulating layer (19).

8. The air treatment plant as claimed in claim 7, wherein a plurality of the inner layer of the modular units (11) have flanges (22) directed towards an interior of the housing (1) at adjoining edges of the modular units.

9. The air treatments plant as claimed in claim 1, characterised in that the other side wall parts of the housing (1), as well as the roof (6), consist of modular units (23, 24, 27) comprising panels.

10. The air treatment plant as claimed in claim 1 characterised in that at least one foraminated conveyor belt (28) forms the bottom of the trough (29).

* * * * *